No. 682,203. Patented Sept. 10, 1901.
T. B. KINRAIDE.
STATIC MACHINE.
(Application filed Mar. 5, 1901.)
(No Model.)

Witnesses.
Edward H. Allen.
Thomas J. Drummond.

Inventor.
Thomas B. Kinraide.
by Crosby & Gregory
attys.

UNITED STATES PATENT OFFICE.

THOMAS B. KINRAIDE, OF BOSTON, MASSACHUSETTS.

STATIC MACHINE.

SPECIFICATION forming part of Letters Patent No. 682,203, dated September 10, 1901.

Application filed March 5, 1901. Serial No. 49,703. (No model.)

*To all whom it may concern:*

Be it known that I, THOMAS B. KINRAIDE, a citizen of the United States, residing at Boston, in the county of Suffolk and State of Massachusetts, have invented an Improvement in Static Machines, of which the following description, in connection with the accompanying drawings, is a specification, like letters on the drawings representing like parts.

As is well known, the usual static machine is very uncertain as to its polarity, being liable to reverse at any moment and keep changing irregularly according as the electrical balance is disturbed; and accordingly it is the purpose of my present invention to provide means for effectually preventing the said reversal and maintaining the parts under such condition that one pole will always be negative and the other pole always be positive.

The constructional details of my invention will be pointed out in the course of the following description and the operation thereof fully set forth, and the invention will be particularly defined in the appended claims.

Figure 1:
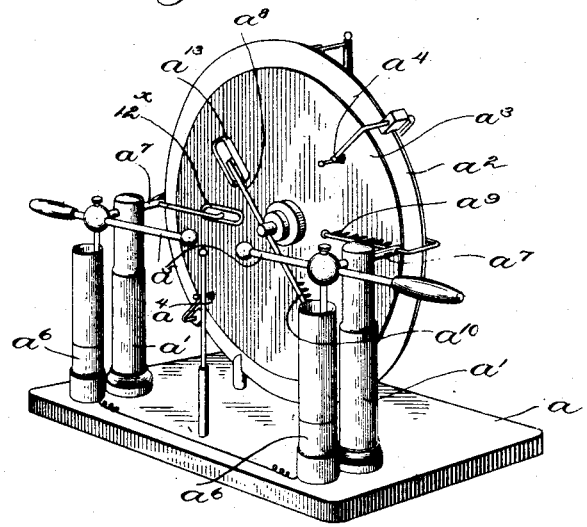
Figure 2:

In the drawings, Figure 1 represents a typical form of influence or static machine provided with my invention. Fig. 2 is a perspective view of a portion thereof.

For convenience of illustration I have represented in the drawings a form of the Toeppler-Holtz machine, although it will be understood that my invention is applicable to any kind of static machine.

The machine herein shown is well known and therefore need not be minutely described. In general it comprises, so far as the parts are shown in the drawings, a base $a$, standards $a'$, glass plate $a^2$, and one or more ebonite or glass plates $a^3$, in connection with brushes $a^4$, discharge-rods $a^5$, condensers or Leyden jars $a^6$, conductors $a^7$, and a short-circuit rod $a^8$. As formerly constructed the two conductors $a^7$ have been provided at their inner ends with similar combs, the same as is shown at $a^9$ and $a^{10}$ in the drawings, the result being that either pole of the machine would give or take electricity with equal freedom, and hence one pole might be the positive collector of the machine at one moment and negative at the next moment, the machine reversing and discharging back without control. I have discovered, however, that by having a plane receiving-electrode $a^{12}a^{13}$, or, as it may be termed, an electrode having a large flat area constructed without tendency to discharge, said electrode or electrodes being located at the positive region of the machine, and by having the usual comb-like electrode or electrodes at the negative region of the machine the latter will be under exact control and will maintain the proper direction continuously. The general form of electrode which I prefer to employ is that fully described in my copending application, Serial No. 26,709, filed August 13, 1900, and, as herein shown, the same has a plane surface next to the moving field $a^3$ and an elongated radially-extending shape, as is clearly shown in both figures, the edges thereof being rounded or rolled outwardly and inwardly, as is clearly shown at $a^{14}$, Fig. 2.

In operation a machine constructed as above explained operates as follows: The positive electricity passes invariably from the plate $a^3$ to the electrode $a^{12}$ and from the electrode $a^9$, the same operation also taking place through the neutralizing or short-circuiting rod $a^8$, the positive electricity passing to the end $a^{13}$ and out at the end $a^{10}$, and a reversal cannot take place, for the reason that there is always a decided opposition to any discharge from the electrode $a^{12}$ to the plate, whereas there is comparatively no opposition at the opposite end $a^9$, or, in other words, the terminals are provided, respectively, with forms of receiving and discharging electrodes best adapted, respectively, to receive without discharging and to discharge without receiving the static charge.

My invention is by no means restricted to the form herein shown, as it may be embodied in various ways all within the spirit and scope of my invention as herein set forth and as further defined in the claims. The principle of my invention is not restricted to the parts shown, as for some purposes it may be applied to other parts—as, for instance, to the brushes.

Having described my invention, what I claim as new, and desire to secure by Letters Patent, is—

1. In a static machine, the combination with the plate, of means at the receiving-terminal for preventing discharge thereat, and means at the opposite terminal for freely permitting discharge thereat.

2. In a static machine, the combination with the plate, of receiving and discharge terminals, the former being in the form of a plane electrode of considerable area substantially parallel to the plate, and the latter in the form of one or more discharge-points.

3. In a static machine comprising means for generating a static field, and electrodes for coöperating therewith, a neutralizing rod or means, having at one end an enlarged plane terminal for readily receiving electricity and reluctantly discharging the same, and at its other end terminating in means freely discharging the charge received by said plane terminal.

4. In a static machine, the combination with the plate, of a plane receiving-electrode having an extended area parallel to the surface of the plate, and a coöperating electrode having a discharge point or points next to the plate.

In testimony whereof I have signed my name to this specification in the presence of two subscribing witnesses.

THOMAS B. KINRAIDE.

Witnesses:
   GEO. H. MAXWELL,
   GEO. W. GREGORY.